United States Patent
Mast-Hale et al.

(10) Patent No.: US 11,920,086 B1
(45) Date of Patent: Mar. 5, 2024

(54) FRICTION REDUCERS FOR DISSOLVED SOLIDS TOLERANCE

(71) Applicant: Halliburton Energy Services, Inc., Houston, TX (US)

(72) Inventors: Nicole Mast-Hale, Houston, TX (US); Denise Nicole Benoit, Houston, TX (US); I Wayan Rakananda Saputra, Houston, TX (US); Francisco Xavier Ruiz, II, Conroe, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/899,964

(22) Filed: Aug. 31, 2022

(51) Int. Cl.
| | |
|---|---|
| *C09K 8/64* | (2006.01) |
| *C09K 8/60* | (2006.01) |
| *C09K 8/80* | (2006.01) |
| *C09K 8/82* | (2006.01) |
| *E21B 43/267* | (2006.01) |

(52) U.S. Cl.
CPC ............... *C09K 8/82* (2013.01); *C09K 8/602* (2013.01); *C09K 8/64* (2013.01); *C09K 8/80* (2013.01); *E21B 43/267* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 5,292,800 A | 3/1994 | Moench et al. | |
| 5,633,220 A * | 5/1997 | Cawiezel | C09K 8/64 |
| | | | 507/923 |
| 7,247,604 B2 | 7/2007 | Dalmazzone et al. | |
| 11,162,011 B2 | 11/2021 | Sawant et al. | |
| 11,268,015 B2 | 3/2022 | Bai et al. | |
| 2012/0035085 A1* | 2/2012 | Parnell | C09K 8/588 |
| | | | 507/213 |
| 2019/0153303 A1* | 5/2019 | Riley | B01F 23/405 |
| 2019/0241796 A1 | 8/2019 | Mast et al. | |
| 2020/0299561 A1 | 9/2020 | Sudur Zalluhoglu et al. | |
| 2021/0324259 A1 | 10/2021 | Diley et al. | |

FOREIGN PATENT DOCUMENTS

| | | |
|---|---|---|
| WO | 2021016155 | 1/2021 |
| WO | 2021248305 | 12/2021 |

OTHER PUBLICATIONS

Researchgate, Creating Value for the High-Saline Bakken Produced Water by Optimizing its Viscoelastic Properties and Proppant Carrying Tendency with High-Viscosity Friction Reducers, SPE200809-MS, Sep. 2021.

* cited by examiner

*Primary Examiner* — Andrew Sue-Ako
(74) *Attorney, Agent, or Firm* — Thomas Rooney; C. Tumey Law Group PLLC

(57) ABSTRACT

A variety of methods and compositions are disclosed, including, in one embodiment, A friction reducer comprising: a continuous phase comprising a base oil and a secondary oil, wherein the secondary oil is different than the base oil; a discontinuous phase dispersed in the continuation phase, wherein the discontinuous phase comprises water and a water-soluble polymer; and an emulsifying surfactant.

19 Claims, 1 Drawing Sheet

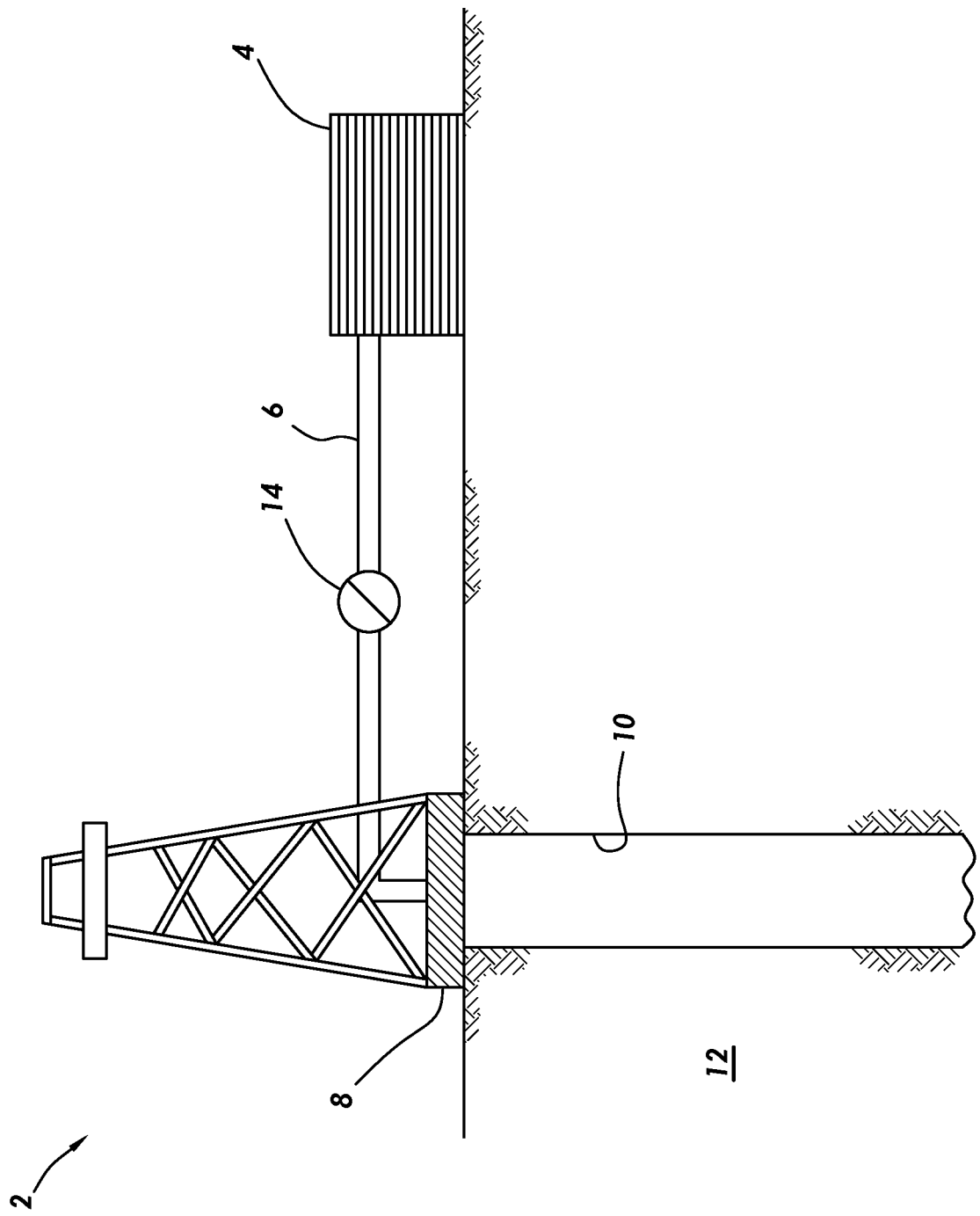

US 11,920,086 B1

FRICTION REDUCERS FOR DISSOLVED SOLIDS TOLERANCE

BACKGROUND

Hydrocarbon-producing wells may be stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore may be increased, enhancing hydrocarbon recovery rates.

An important component of hydraulic fracturing fluids is a friction reducer. Pumping rates for hydraulic fracturing operations may regularly exceed 50 barrels per minute (8 m$^3$/min) or more, which may cause turbulence in conduits such as wellbore tubing, liners, and casings. Turbulent flow of hydraulic fracturing fluids leads to high horsepower requirements to maintain pressure and flow rates. Some common friction reducers may include long chain water soluble polymers which may aid in moderating turbulence by reducing eddy currents within a conduit.

Friction reducers may be selected to be included in a fracturing fluid (or other treatment fluids) based at least in part on chemical properties of aqueous base fluids available to mix the fracturing fluid at a well site. The properties of aqueous base fluids such as total dissolved solids, pH, and temperature may affect the performance of the friction reducing polymer. Dissolved solids may reduce performance of the friction reducers, for example, through association or another mechanism, the dissolved solids may alter/hinder inversion, hydration and/or elongation of the friction reducers. A loss of performance of a friction reducer may lead to a reduction in the viscosity of the fracturing fluid and may increase the horsepower required to maintain flow rates. The loss in performance may further lead to less efficient movement of proppant particles in the fracturing fluid and may restrict flow across the perforations in the wellbore and restrict flow through fractures generated in the subterranean formation.

BRIEF DESCRIPTION OF THE DRAWINGS

These drawings illustrate certain aspects of some of the embodiments of the present disclosure and should not be used to limit or define the disclosure.

The FIGURE is a schematic view of an example well system utilized for hydraulic fracturing.

DETAILED DESCRIPTION

The present disclosure relates to oil-based friction reducer additives and, more particularly, to methods and compositions that improve friction reducer performance by adding a secondary base oil. The friction reducers may be used in well treatments to reduce frictional loss from treatment fluids as they are being pumped downhole. While the present methods and compositions may be particularly useful for improvement of friction reducer performance in a variety of subterranean applications, they may be particularly useful for in hydraulic fraction application where frictional losses can be especially problematic.

Friction reducers that receive base oil additives may be in the form of an oil-external emulsion that includes a continuous phase, a discontinuous phase, and an emulsifying surfactant. The continuous phase may include a base oil and a secondary oil, wherein the secondary oil is different than the base oil. The discontinuous phase may include water and a water-soluble polymer. As used herein, "water-soluble" means at least about 0.1 g of solute dissolves in 100 ml of distilled water, at 25° C. and 1 atm of pressure.

In operation, the friction reducer may be combined with water for preparation of a treatment fluid that can then be used in a variety of subterranean applications. In the water, the friction reducer should invert, thus releasing the water-soluble polymer into the treatment fluid's water. As discussed above, however, the water used in preparation of the treatment fluids, such as fracturing fluids, may contain dissolved solids which can interfere with the performance of friction reducers. For example, the dissolved solids can interfere with inversion of the friction reducer. In general, the inversion efficiency of the friction reducer goes down as total dissolved solids (TDS) of the water goes up. If the friction reducer does not properly invert, the water-soluble polymer is not released into the treatment fluid's water and, thus, may not provide a desired level of friction reduction. To improve inversion efficiency, surfactants referred to as "inverting surfactants" may be included in the friction reducer. Where used, the inverting surfactants may be added to the friction reducer post-synthesis and/or directly to the treatment fluid. While inverting surfactants can be included, they are typically expensive can add an undesirable cost to the friction reducer.

In accordance with one or more embodiments, base oil additives may be used to improve friction reducer performance. There may be several potential advantages to base oil additives in the friction reducer, only some of which may be alluded to herein. One of the many potential advantages of base oil addition is improved inversion efficiency in high TDS water. For example, it has been shown that a secondary-oil-containing friction reducer has better friction reduction than the same friction reducer without the secondary oil, thus indicating improved inversion efficiency. In addition, since the secondary-oil-containing friction reducer has better friction reduction, less of the water-soluble polymer is needed to achieve the same friction reduction as the same water-soluble polymer in a friction reducer without a secondary base oil. Another potential advantage is reduced viscosity of the neat material making it easier to dispense and handle. Another potential advantage is reduced cost of the secondary-oil-containing friction reducer. For example, since inverting surfactants are not necessary to have desirable inversion efficiency, use of the high-cost inverting surfactants can be minimized. Yet another potential advantage is improved performance of the water-soluble polymer and, thus, improved friction reduction.

In one or more embodiments, a secondary oil may be combined with the friction reducer. The secondary oil is selected based at least partially on one or more properties of a water sample. The one or more properties may include TDS, pH, temperature, or ionic composition of the water. By matching the secondary oil and/or a concentration of the secondary oil to TDS, enhanced performance of the friction reducer may be obtained. For example, a predetermined Kb target (e.g., a specific Kb value or range of Kb values) of the continuous phase may be known to provide improved inversion efficiency for a range of TDS. As used herein, the term "Kb" value refers to Kauri-butanol value and is determined in accordance with ASTM D1133. Accordingly, by adjustment of the Kb value of the continuous phase by way of secondary oil addition, inversion efficiency may be improved in accordance with one or more embodiments. The type and/or concentration of the secondary oil may be selected to adjust the Kb value of the continuous phase to the Kb target.

The friction reducer may be combined with the secondary oil in any suitable amount. For example, the friction reducer may be combined with a secondary oil such that the friction reducer comprises the secondary oil in an amount of about 5% to about 80% by weight of the final composition. By way of further example, the secondary oil may be present in an amount of at least about 15% to about 60%, about 15% to about 50%, about 15% to about 30%, about 25% to about 80%, about 25% to about 60%, about 25% to about 50%, about 40% to about 80%, about 40% to about 60%, or about 50% to about 80% by weight of the final composition. In some embodiments, the secondary oil is present in an amount of about 15%, about 20%, about 30%, about 40%, about 50%, about 60%, about 70%, or about 80% by weight of the final composition. By way of further example, the friction reducer may be present in the secondary-oil-containing friction reducer in an amount of about 20% to about 95%, including an amount of about 40% to about 85%, about 50% to about 85%, about 70% to about 85%, about 20% to about 75%, about 40% to about 75%, about 50% to about 75%, about 20% to about 60%, about 40% to about 60%, or about 30% to about 50% by weight of the secondary-oil-containing friction reducer. In some embodiments, the friction reducer is present in an amount of about 20%, about 30%, about 40%, about 50%, about 60%, about 70%, about 80%, about 90%, or about 95% by weight of the secondary-oil-containing friction reducer An example technique for optimizing a friction reducer by way of secondary oil addition will now be described in more detail. The example technique includes selecting a friction reducer, wherein the friction reducer is in the form of an oil external emulsion. The example technique next includes determining a secondary oil and secondary oil concentration for the friction reducer in a water sample. The step of determining can be repeated for one or more additional water samples to develop a correlation between a secondary oil and a water sample property. The example technique next includes combining the selected friction reducer with the determined secondary oil at the secondary oil concentration to form a secondary-oil-containing friction reducer.

The example technique includes selecting a friction reducer. The friction reducer should be a conventional friction reducer without a secondary oil. For example, the friction reducer may be in the form of an oil-external emulsion that includes a continuous phase of a base oil, a discontinuous phase of water and a water-soluble polymer, and an emulsifying surfactant. In one or more embodiments, the friction reducer may be selected at least partially based on a water sample. For example, the friction reducer may be selected based on its performance in the water sample. The water sample may be a sample of water from a specific region or area such that friction reducer performance may be optimized for that water sample.

In one or more embodiments, the friction reducer selected may be a high-performing friction reducer in the water sample. Any suitable technique may be used to determine whether the friction reducer is high performing. For example, a friction flow loop system may be used to evaluate the performance of two or more friction reducers in the water. In these embodiments, the high-performing friction reducer may be one that performs better than the mean of the tested frictions reducers. By way of further example, critical concentration, $C^*$, and/or dilute relaxation time, $\lambda_d$. $C^*$ is the concentration of a polymer necessary to cause polymer chain overlap in the water sample. As used herein, $C^*$ is determined in accordance with the method described by Jouenne and Levache in *Universal Viscosifying Behavior of Acrylamide-Based Polymers Used in Enhanced Oil Recovery*, Journal of Rheology, 65(5), September 2020. In these embodiments, the high-performing friction reducer may have a $C^*$ less than a mean $C^*$ of the tested friction reducers. Alternatively, the high-performing friction reducer may have a $C^*$ less than a predetermined $C^*$, for example, of a comparative friction reducer. Dilute relaxation time is related to the amount of elastic energy being stored by a polymer. As used herein, dilute relaxation time is determined in accordance with the method described by Jouenne and Levache in *Universal Viscosifying Behavior of Acrylamide Based Polymers Used in Enhanced Oil Recovery*, Journal of Rheology, 65(5), September 2020. In these embodiments, the high-performing friction reducer may have a dilute relaxation time greater than a mean of the tested friction reducers. Alternatively, the high-performing friction reducer may have a dilute relaxation time greater than a predetermined dilute relaxation time, for example, of a comparative friction reducer.

The example technique next includes determining a secondary oil and secondary oil concentration for at least one of the friction reducers in a water sample. The secondary oil and secondary oil concentration may be determined for the friction reducer in the water sample by evaluating friction reducer performance with a variety of different base oils at one or more concentrations. For example, the selected friction reducer may be included in the water sample. In some embodiments, the selected friction reducer is added to the water sample at its $C^*$ concentration. The friction reducer performance of the friction reducer in the water sample may then be determined, for example, in a friction loop test. For example, a friction loop test may be performed to obtain friction data. A secondary-oil-containing friction reducer may then be determined by combining the friction reducer with a first secondary oil at a test secondary oil concentration (e.g., between 5% to 85% secondary oil). The friction reducer performance of the secondary-oil-containing friction reducer in the water sample may then be determined, for example, in a friction loop test. The secondary-oil-containing friction reducer performance for one or more additional secondary oils may also be determined. The secondary-oil-containing friction reducer performance with the different secondary oils that were tested may then be compared to select a secondary oil. For example, the secondary-oil-containing friction reducer with the highest friction reduction from the friction loop test may be selected. For selection of secondary oil concentration, the concentration of the secondary oil may also be adjusted with friction loop testing then performed. The secondary oil concentration may be adjusted and each resulting blend tested or a subset of the tested secondary oils, or only the selected secondary oil. The friction reducer performance of the different secondary oil concentrations may then be compared to select a secondary oil concentration. For example, the secondary oil concentration with the highest friction reduction may be selected. The Kb value of the various secondary oils may also be recorded as well as the Kb value of the continuous phase of the secondary-oil-containing friction reducer.

The step of determining a secondary oil and secondary oil concentration can be repeated for one or more additional water samples to develop a correlation between a secondary oil and a water sample property. Examples of water sample properties may include TDS, pH, temperature, or ionic concentrations. By way of example, the correlation may be between the base oil and TDS of the water sample. By way of further example, the correlation may be between Kb value of the secondary oil and TDS. With these correlations, a secondary-oil-containing friction reducer may be prepared for use in water that was not tested. For example, TDS of a water sample may be measured. The measured TDS of the water sample may then be applied to the correlation between the secondary oil and the water sample property to select a secondary oil and/or secondary oil concentration. In one or more embodiments, application of the measured TDS to the correlation provides a secondary oil Kb value for optimum performance in the water sample. A secondary oil (or combination of secondary oils) may then be selected with the Kb value and used combination with the base friction reducer.

The example technique next includes combining the selected friction reducer with the determined secondary oil at the secondary oil concentration to form a secondary-oil-containing friction reducer.

The secondary-oil-containing friction reducer includes a continuous phase and a discontinuous phase. The continuous phase and discontinuous phase can be present at any suitable continuous-to-discontinuous phase ratio for a particular application. For example, the secondary-oil-containing friction reducer may have a continuous-to-discontinuous phase ratio of about 90/10 to about 10/90. By way of further example, the secondary-oil-containing friction reducer may a continuous-to-discontinuous phase ratio of about 90/10 to about 30/70, or about 90/10 to about 90/50.

The continuous phase includes a base oil and a secondary oil. The base oil was provided in the original friction reducer while the secondary oil was blended with the friction reducer to provide the secondary-oil-containing friction reducer. The secondary oil will typically be a different oil than the base oil as the secondary oil was selected to optimize performance of the friction reducer in the fracturing fluid. Suitable oils for the base and/or secondary oil may include natural, modified, or synthetic oils. Examples of suitable oils for the base and/or secondary oil include paraffinic hydrocarbons, naphthenic hydrocarbons, aromatic hydrocarbons, and mixtures thereof. The paraffin hydrocarbons may include saturated, linear, or branched paraffin hydrocarbons. Examples of suitable aromatic hydrocarbons include, but are not limited to, benzene, toluene, and xylene. Additional examples of suitable oils for the base and/or secondary oil include mineral oils, terpenes, oil of turpentines, kerosenes, napthas, petrolatums, petroleum distillates, Gas-To-Liquid (GTL) oils, hydrocarbon-based solvent, silicone oils, biolubes, vegetable oils, modified vegetable oils, olive oils, sesame oils, vegetable oils, avocado oils, canola oils, coconut oil, fish oils, other oil from plant, fish, and/or animal origins. and modified versions of these oils. Mineral oil is often referred with other names such as paraffin oil, paraffinic oil, lubricating oil, white mineral oil, and white oil.

The base oil may be present in the secondary-oil-containing friction reducer in any suitable amount for a particular application. The base oil concentration may be selected, for example, in an amount sufficient to provide a stable emulsion prior to addition of the secondary oil. For example, the base oil may be included in the secondary-oil-containing friction reducer in an amount of about 5% to about 95% by weight of the secondary-oil-containing friction reducer. By way of further example, the base oil may be present in the secondary-oil-containing friction reducer in an amount of at least about 15% to about 60%, about 15% to about 50%, about 15% to about 30%, about 25% to about 80%, about 25% to about 60%, about 25% to about 50%, about 40% to about 80%, about 40% to about 60%, or about 50% to about 80% by weight of the secondary-oil-containing friction reducer. In some embodiments, the base oil is present in an amount of about 15%, about 20%, about 30%, about 40%, about 50%, about 60%, about 70%, or about 80% by weight of the secondary-oil-containing friction reducer. In some embodiments, the base oil may be included in the secondary-oil-containing friction reducer in an amount of about 6.25% to about 90.5% by weight of the secondary-oil-containing friction reducer.

The secondary oil may be present in the secondary-oil-containing friction reducer in any suitable amount for a particular application. The secondary oil concentration may be selected, for example, to optimize friction reducer performance in the fracturing fluid. For example, the secondary oil may be included in the secondary-oil-containing friction reducer in an amount of about 5% to about 80% by weight of the secondary-oil-containing friction reducer. By way of further example, the secondary oil may be present in the secondary-oil-containing friction reducer in an amount of at least about 5% to about 60%, about 5% to about 40%, about 5% to about 20%, 10% to about 80%, about 10% to about 60%, about 10% to about 40%, about 20% to about 80%, about 20% to about 60%, about 40% to about 80%, about 40% to about 60%, or about 60% to about 80% by weight of the secondary-oil-containing friction reducer. In some embodiments, the secondary oil is present in an amount of about 5%, about 10%, about 20%, about 30%, about 40%, about 50%, about 60%, about 70%, or about 80% by weight of the secondary-oil-containing friction reducer.

As previously described, the secondary oil may be selected based on the water sample, for example, to optimize performance of the friction reducer. For example, the secondary oil should improve various properties of the friction reducer, including, but not limited, to inversion, hydration, and polymer performance. The secondary oil has a Kb value. The base oil also has a Kb value. Without being limited by theory, it has been found that there is a synergy between Kb value of the base oil and friction reducer performance. Thus, by optimizing the type and concentration of secondary oil, the Kb value of the mixture of the secondary oil and base oil can be optimized. For example, the type and concentration of the secondary oil may be provided to provide the mixture with a predetermined Kb target. In other words, the type and amount of the secondary oil may be selected to adjust the Kb value of the continuous phase to a predetermined Kb target. In some embodiments, the secondary oil has a Kb value of about 5 to about 240. In alternative embodiments, the secondary oil has a Kb value of about 5 to about 200, about 5 to about 100, about 5 to about 50, about 5 to about 40, about 20 to about 240, about 20 to about 100, about 20 to about 50, about 20 to about 30, or about 30 to about 35. The secondary oil may be mixed with a base oil with Kb value that varies by about 25%, about 50%, about 100%, about 200% or more from the secondary oil. In some embodiments, the secondary oil is included to provide a combined mixture with a Kb value that has increased with respect to the Kb value of the base value, for example, increased by about 25%, about 50%, about 100%, or more. In some embodiments, the secondary oil is included to provide a combined mixture with a Kb value that has decreased with respect to the Kb value of the base value, for example, decreased by about 25%, about 50%, about 100%, or more.

In some embodiments, the secondary oil includes a combination of two or more oils. For example, the secondary oil may include a first secondary oil and a second secondary oil. The two or more oils may be mixed and then combined with the oil-external emulsion. Alternatively, the two or more oils may be separately added to the oil-external emulsion. The two or more oils may be included in any suitable amount. For example, the concentration and type of the two or more oils may selected to provide a secondary oil with a predetermined Kb value.

The first secondary oil may be present in the secondary-oil-containing friction reducer in any suitable amount for a particular application. The first secondary oil concentration may be selected, for example, based on at least Kb value to optimize friction reducer performance in the fracturing fluid. For example, the first secondary oil may be included in the secondary-oil-containing friction reducer in an amount of about 5% to about 80% by weight of the secondary-oil-containing friction reducer. By way of further example, the first secondary oil may be present in the secondary-oil-containing friction reducer in an amount of at least about 5% to about 60%, about 5% to about 40%, about 5% to about 20%, 10% to about 80%, about 10% to about 60%, about 10% to about 40%, about 20% to about 80%, about 20% to about 60%, about 40% to about 80%, about 40% to about 60%, or about 60% to about 80% by weight of the secondary-oil-containing friction reducer. In some embodiments, the first secondary oil is present in an amount of about 5%, about 10%, about 20%, about 30%, about 40%, about 50%, about 60%, about 70%, or about 80% by weight of the secondary-oil-containing friction reducer.

The second secondary oil may be present in the secondary-oil-containing friction reducer in any suitable amount for a particular application. The second secondary oil concentration may be selected, for example, based on at least Kb value to optimize friction reducer performance in the fracturing fluid. For example, the second secondary oil may be included in the secondary-oil-containing friction reducer in an amount of about 5% to about 80% by weight of the secondary-oil-containing friction reducer. By way of further example, the second secondary oil may be present in the secondary-oil-containing friction reducer in an amount of at least about 5% to about 60%, about 5% to about 40%, about 5% to about 20%, 10% to about 80%, about 10% to about 60%, about 10% to about 40%, about 20% to about 80%, about 20% to about 60%, about 40% to about 80%, about 40% to about 60%, or about 60% to about 80% by weight of the secondary-oil-containing friction reducer. In some embodiments, the second secondary oil is present in an amount of about 5%, about 10%, about 20%, about 30%, about 40%, about 50%, about 60%, about 70%, or about 80% by weight of the secondary-oil-containing friction reducer.

The discontinuous phase includes water and a water-soluble polymer. The discontinuous phase may include droplets of the water and water-soluble polymer dispersed in the continuation phase. When the secondary-oil-containing friction reducer is combined with the water for the fracturing fluid, the oil-external emulsion of the secondary-oil-containing friction reducer should be inverted to expose the water-soluble polymer to the bulk aqueous liquid of the fracturing fluid.

The water present in the discontinuous phase may be from any source provided it does not contain an excess an excess of compounds that may adversely affect other components of the secondary-oil-containing friction reducer. In some embodiments, the water may include one or more salts. The water may be present in any suitable amount, including an amount of about 4% to about 50% by weight of the secondary-oil-containing friction reducer.

The water-soluble polymers may be considered a friction-reducing polymer as it should have the property of reducing friction in the fluids they are added to. Friction-reducing polymers should decrease the amount of power required to move a fracturing fluid through a conduit and subterranean formation by modifying the fluid characteristics by changing the flow of the fluid from turbulent to laminar. Some commonly used water-soluble polymers may include acrylamide-containing polymers, however there may be a wide range of chemistries which are suitable for use as a water-soluble polymer. In general, the water-soluble polymer may be stored in water droplets dispersed in the continuous phase. The oil-external emulsion may need to be inverted in operation to form a water external emulsion such that the friction reducer droplets may be exposed to the bulk aqueous fluid. One challenge of using friction reducers in aqueous fluids with dissolved solids is that the dissolved solids may be electrically attracted to and associate with the friction reducer which may result in a reduction of performance and a reduction in fluid viscosity. The loss of friction reducer performance may lead to high power requirements and poor solids transport.

Suitable water-soluble polymers may be anionic, cationic, non-ionic, or zwitterionic depending on the monomers used to synthesize the water-soluble polymer. In general, water-soluble polymers having higher molecular weights may be needed to provide desirable levels of friction reduction. For example, the water-soluble polymer may have a weight average molecular weight of about 1,000,000 to about 20,000,000, as determined using intrinsic viscosities. By way of further example, the water-soluble polymer may have a weight average molecular weight of about 2,500,000 to about 20,000,000 or about 7,500,000 to about 20,000,000, as determined using intrinsic viscosities. Water-soluble polymers having molecular weights outside the listed range may still provide some degree of friction reduction in an aqueous treatment fluid. As used herein, intrinsic viscosity is determined using a Ubbelohde Capillary Viscometer and solutions of the water-soluble polymer in 1M NaCl solution, at 30° C., and pH 7 at 0.05 wt. %, 0.025 wt. % and wt. % and extrapolating the measured values to zero concentration to determine the intrinsic viscosity. The molecular weight of the water-soluble polymer is then determined using the Mark-Houwink equation as is known in the art.

Suitable water-soluble polymer may be synthesized from a variety of monomeric units. Typically, the composition of the water-soluble polymer will be generally the same or about the same as the composition of the monomer mixture. Examples of suitable monomers include acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. In some embodiments, the water-soluble polymer includes a cationic monomer, such as (meth)acrylamidopropyltrimethyl ammonium halides, (m eth)acryloyloxyethyltrimethyl ammonium halides, (m eth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide. In other embodiments, the (meth)acrylamidopropyltrimethyl ammonium halide is (meth)acrylamidopropyltrimethyl ammonium chloride ("MAPTAC"). In other embodiments, the (meth) acryloyloxyethyltrimethyl ammonium halide is acryloyloxyethyltrimethyl ammonium chloride ("AETAC"). In other embodiments, the diallyl dimethyl ammonium halide is diallyl dimethyl ammonium chloride ("DADMAC"). Examples of suitable water-soluble polymers may include, but not limited to, a polyacrylamide, a polyacrylamide derivative, a synthetic polymer, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, and combinations thereof. Examples of suitable water-soluble polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the water-soluble polymer may be neutralized by ions present in the fracturing fluid.

The water-soluble polymer may be present in in the secondary-oil-containing friction reducer in any suitable amount for a particular application. For example, the water-soluble polymer may be present in an amount of about 10% to about 50% by weight of the secondary-oil-containing friction reducer. By way of example, the water-soluble polymer may be present in an amount of about 10% to about 30%, about 10% to about 20%, about 12% to about 50%, about 12% to about 40%, about 12% to about 30%, about 15% to about 50%, or about 15% to about 40% by weight of the secondary-oil-containing friction reducer. In some embodiments, the water-soluble polymer is present in an amount of about 10, about 12%, about 15%, about 20%, about 25%, about 30%, about 35%, or about 40% by weight of the secondary-oil-containing friction reducer.

The secondary-oil-containing friction reducer further includes an emulsifying surfactant. Any suitable water-in-oil emulsifier can be used as the emulsifying surfactant for the secondary-oil-containing friction reducer. The emulsifying surfactant may be present in the continuous phase. Non-limiting examples of suitable emulsifying surfactants include: fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol; fatty acid esters of sorbitan, for instance sorbitan monoleate, sorbitan dioleate, sorbitan trioleate, sorbitan monostearate and sorbitan tristearate; fatty acid esters of mannitol, for instance mannitol monolaurate or mannitol monopalmitate; fatty acid esters of pentaerythritol, for instance pentaerythritol monomyristate, pentaerythritol monopalmitate and pentaerythritol dipalmitate; fatty acid esters of polyethylene glycol sorbitan, more particularly the monooleates; fatty acid esters of polyethylene glycol mannitol, more particularly the monooleates and trioleates; fatty acid esters of glucose, for instance glucose monooleate and glucose monostearate; trimethylolpropane distearate; the products of reaction of isopropylamide with oleic acid; fatty acid esters of glycerol sorbitan; ethoxylated alkylaines; sodium hexadecyl phthalate; sodium decyl phthalate; and oil-soluble alkanolamides. In some embodiments, the emulsifying surfactants include ethoxylated nonionic surfactants, guerbet alcohol ethoxylate, and mixtures thereof. Specific examples of suitable emulsifying surfactants include tall oil fatty acid diethanolamine, polyoxyethylene (5) sorbitan monoleate, and sorbinate monoleate The emulsifying surfactant may be present in the secondary-oil-containing friction reducer at any suitable amount for a particular application. For example, the emulsifying surfactant may be present in an amount sufficient to form a stable oil external emulsion. In some embodiments, the emulsifying surfactant may be present in the secondary-oil-containing friction reducer in an amount of about 0.1% to about 7% by weight of the secondary-oil-containing friction reducer. In further embodiments, the emulsifying surfactant may be present in the secondary-oil-containing friction reducer in an amount of about 0.25% to about 7%, about 0.5% to about 7%, about 1% to about 7%, about 0.1% to about 5%, about 0.25% to about 5%, about 0.5% to about 5%, about 1% to about 5%, about 0.1% to about 2.5%, about 0.25% to about 2.5%, about 0.5% to about 2.5%, or about 1% to about 2.5% by weight of the secondary-oil-containing friction reducer. In some embodiments, the emulsifying surfactant may be present in an amount of about 0.1%, about 0.25%, about 0.5%, about 0.75%., about 1%, about 2%, about 3%, about 4%, about 5%, about 6%, or about 7% by weight of the secondary-oil-containing friction reducer.

Those of ordinary skill in the art, with the benefit of this disclosure, should recognize that the secondary-oil-containing friction reducer may include any number of additional additives as may be appropriate for a particular application. Examples of such additives include salts, polymerization inhibitors, inverting surfactants, water modifier, rheology modifiers, slurry modifiers, compatibility modifiers, additional friction reducer, biocide, chelant, clay control, crosslinker, scale inhibitors, and combinations thereof.

The secondary-oil-containing friction reducer may be prepared by any suitable technique. For example, emulsion polymerization may be used to prepare a suitable water-soluble polymer in an oil-external emulsion, wherein the oil-external emulsion includes a continuous phase, a discontinuous phase, and an emulsifying surfactant. The continuous phase may include a base oil, and the discontinuous phase may include water and the water-soluble polymer. Additional additives may be included in the oil-external emulsion as described herein. Those of ordinary skill in the art, with the benefit of this disclosure, should recognize an appropriate emulsion polymerization method to synthesize a suitable water-soluble polymer. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art.

To improve performance of the friction reducer, the secondary oil may then be added to the oil-external emulsion. As previously described, the type and/or concentration of the secondary oil may be selected to optimize friction reducer performance. For example, the secondary oil should improve various properties of the friction reducer, including, but not limited, to inversion, hydration, and polymer performance. By way of further example, inclusion of the secondary oil allows release of the water-soluble polymer from the oil-external emulsion and into the treatment fluid more effectively despite their being potentially undesirable TDS levels in the water used in forming the treatment fluid. In some embodiments, the release of the water-soluble polymer from the oil-external emulsion is improved even without inclusion of inverting surfactants, for example, due to selection of the secondary oil and/or secondary oil concentration based on a water sample.

The secondary-oil-containing friction reducer may be included in a treatment fluid used in subterranean treatments to reduce friction. Such subterranean treatments include, drilling operations, stimulation treatments (e.g., fracturing treatments, acidizing treatments, fracture acidizing treatments), and completion operations. Those of ordinary skill in the art, with the benefit of this disclosure, should be able to recognize a suitable subterranean treatment where friction reduction may be desired.

The secondary-oil-containing friction reducer may be included in the treatment fluid in any suitable amount, including from about 0.1 gallons of the secondary-oil-containing friction reducer per thousand gallons of the treatment fluid ("gpt") to about 4 gpt or more. Alternatively, the secondary-oil-containing friction reducer may be included in an amount ranging from about gpt to about 0.5 gpt, amount ranging from about 0.5 gpt to about 1 gpt, an amount ranging from about 1 gpt to about 2 gpt, an amount ranging from about 2 gpt to about 3 gpt, amount ranging from about 3 gpt to about 5 gpt, or an amount ranging from about 1 gpt to about 10 gpt. As previously described, the oil-external emulsion of the secondary-oil-containing friction reducer inverts to release the water-soluble polymer to the treatment fluid. The secondary-oil-containing friction reducer may be included in the treatment fluid such that an amount of the water-soluble polymer is included in the treatment fluid for a particular application. For example, the water-soluble polymer may be included in the treatment fluid in an amount of about 0.0025% to about 0.4% by weight of the treatment fluid. By way of further example, the water-soluble polymer may be included in the treatment fluid in an amount of about 0.001% to about 0.4%, about 0.005% to about 0.4%, about 0.01% to about 0.4%, about 0.1% to about 0.4%, about 0.0025% to about 0.1%, about 0.0025% to about 0.05%, about 0.0025% to about 0.15%, about 0.0025% to about 0.1%, about 0.01% to about 0.4%, about 0.01% to about 0.1%, about 0.01% to about 0.5%, about 0.01% to about 0.15%, or about 0.01% to about 0.1% by weight of the treatment fluid. In some embodiments, low concentration of the water-soluble polymer may be included, for example, to provide friction reduction with minimal impact on viscosity. For example, if proppant is included in the treatment fluid, velocity rather than viscosity may be relied on for proppant transport. Low concentration may include an amount of about 0.15% or less, for example, about 0.0025% to about 0.15% by weight of the treatment fluid.

The water used in the treatment fluid may include fresh water, produced water, salt water, surface water, or any other suitable water. The term "salt water" is used herein to mean unsaturated salt solutions and saturated salt solutions including brines and seawater. The water used for preparation of the treatment fluid may be from any suitable source. For example, the water may include surface water such as from lakes, rivers, estuaries, and oceans for example, as well as ground water from aquifers and water wells. One additional source of water may be produced water such as water that flows from a hydrocarbon well. Hydrocarbon wells often penetrate subterranean formations that contain a fraction of water alongside hydrocarbons. As such, fluids that are produced from a hydrocarbon well may contain hydrocarbons as well as a fraction of water. The produced fluids may be separated at the surface to generate a hydrocarbon stream and a water stream. The water stream may be further utilized to mix treatment fluids for well treatment such as drilling, cementing, stimulation, and enhanced recovery operations. The separated water stream is also referred to as "produced water." In some embodiments, freshwater may be used, for example, with additional "make up" water used to make up the remaining volume of fluid required for a particular application. Make up water may be from any source as described above including surface water, ground water, and produced water, for example.

The water may be present in the treatment fluid in any suitable amount for a particular application, such as a hydraulic fracturing application. For example, the water may be present in an amount of about 50% to about 99.9% by weight of the treatment fluid. By way of further example, the water may be present in an amount of about 50% to about 90%, about 50% to about 80%, about 50% to about 70%, about 50% to about 60%, about 60% to about 99.9%, about 60% to about 90%, about 60% to about 80%, about 70% to about 99.9%, or about 70% to about 90% by weight of the treatment fluid.

Each of the sources of water may have varying levels of species dissolved therein, including those species previously described, which may affect the stability of secondary-oil-containing friction reducers added to the water.

The water included in the treatment may include dissolved species of salts and metals that make up the TDS count for a particular water sample. As previously described, the TDS in the water may affect the performance of friction reducers added to the water, for example, the water-soluble polymer may not release from the oil-external emulsion easily due to the TDS. The dissolved solids may include chlorides, sulfates, carbonates, bicarbonates, boron, bromide, iodide, magnesium, calcium, strontium, potassium, sodium, iron, barium, lithium, beryllium, iron, zinc, manganese, molybdenum, sulfur in the form of hydrogen sulfide, arsenic, barium, chromium, selenium, uranium, fluorine, and combinations thereof. The concentration of dissolved solids may vary depending on the source of the aqueous based fluid. For example, the water may have a TDS of about 100 parts per million by weight (ppm) to about 350,000 ppm. By way of further example, the water may have a TDS of 100 ppm TDS to about 10,000 ppm, about 100 ppm to about 100,000 ppm, about 100 ppm to about 250,000 ppm, about 500 ppm to about 350,000 ppm, about 1000 ppm to about 350,000, or about 10,000 ppm to about 350,000 ppm. The term "high" in the context of high total dissolved solids or high TDS, may be intended to refer to water having a TDS of greater than 20,000 TDS.

A treatment fluid may include proppants. Proppants may include a collection of solid particles that may be pumped into the subterranean formation, such that the solid particles hold (or "prop") open the fractures generated during a hydraulic fracturing treatment. The proppant may include a variety of solid particles, including, but not limited to, sand, bauxite, ceramic materials, glass materials, polymer materials, polytetrafluoroethylene materials, nutshell pieces, cured resinous particulates including nutshell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

The proppant may have any suitable particle size for a particular application such as, without limitation, nano particle size, micron particle size, or any combinations thereof. As used herein, the term particle size refers to a d50 particle size distribution, wherein the d50 particle size distribution is the value of the particle diameter at 50% in the cumulative distribution. The d50 particle size distribution may be measured by particle size analyzers such as those manufactured by Malvern Instruments, Worcestershire, United Kingdom. For example, a proppant with a d50 particle size distribution of about 10 nanometers to about 100 microns. By way of further example, the proppant may have a d50 particle size distribution of about 10 nanometers to about 100 nanometers, about 100 nanometers to about 300 nanometers, about 300 nanometers to about 700 nanometers, or about 700 nanometers to about 1 micron, or a proppant with a d50 particle size distribution between any of the previously recited ranges. By way of further example, a proppant may have a d50 particle size distribution about 1 micron to about 100 microns, about 100 microns to about 300 microns, about 300 microns to about 700 microns, or about 700 microns to about 1000 micron Proppant may be present in the treatment fluid in any concentration or loading for a particular application. For example, the proppant may be present in an amount of about 0.1 pounds per gallon ("lb/gal") (12 kg/m 3) to about 14 lb/gal (1677 kg/m 3). By way of further example, the proppant may be present in an amount of about 0.1 lb/gal (12 kg/m 3) to about 1 lb/gal (119.8 kg/m 3), about 1 lb/gal (119.8 kg/m 3) to about 3 lb/gal (359.4 kg/m 3), about 3 lb/gal (359.4 kg/m 3) to about 6 lb/gal (718.8 kg/m 3), about 6 lb/gal (718.8 kg/m 3) to about 9 lb/gal (1078.2 kg/m 3), about 9 lb/gal (1078.2 kg/m 3) to about 12 lb/gal (1437.6 kg/m 3), or about 12 lb/gal (1437.6 kg/m 3) to about 14 lb/gal (1677.2 kg/m 3).

The treatment fluid may include any number of additional optional additives as desired for a particular application, Examples of suitable additives include salts, acids, fluid loss control additives, gas, foamers, corrosion inhibitors, scale inhibitors, catalysts, clay control agents, biocides, iron control agent, antifoam agents, bridging agents, dispersants, hydrogen sulfide ("$H_2S$") scavengers, carbon dioxide ("$CO_2$") scavengers, oxygen scavengers, lubricants, breakers, weighting agents, inert solids, emulsifiers, emulsion thinner, emulsion thickener, surfactants, lost-circulation additives, pH control additive, buffers, crosslinkers, stabilizers, chelating agents, mutual solvent, oxidizers, reducers, consolidating agent, complexing agent, sequestration agent, control agent, particulate materials, diversion materials, conformance material, relative permeability modifiers, and any combination thereof. With the benefit of this disclosure, one of ordinary skill in the art should be able to recognize and select a suitable optional additive for use in the treatment fluid.

The treatment fluids disclosed herein may be used in any subterranean treatment where the reduction of friction is desired. Such subterranean treatments may include stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

An example method may include treating a portion of a subterranean formation. The method may include providing a secondary-oil-containing friction reducer in the form of an oil external emulsion that includes a continuous phase, a discontinuous phase, and an emulsifying surfactant. The continuous phase may include a base oil and a secondary oil, wherein the secondary oil is different than the base oil. The discontinuous phase may include water and a water-soluble polymer. The components of the secondary-oil-containing friction reducer are described herein. The method may further include combining the secondary-oil-containing friction reducer with at least water to form a treatment fluid. As described herein, at least a portion of the oil-external should invert releasing the water-soluble polymer into the treatment fluid. The method may further include introducing the treatment fluid into the subterranean formation. For example, the treatment fluid may be introduced into the subterranean formation such that one or more fractures are induced in the subterranean formation. Inducing one or more fractures as used herein is intended to cover creation of new fractures in the subterranean formation as well as extension of existing fractures. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention further may comprise preparing the treatment fluid. Preparing the aqueous treatment fluid may comprise providing a secondary-oil-containing friction reducer in the form of an oil external emulsion that includes a continuous phase, a discontinuous phase, and an emulsifying surfactant. The continuous phase may include a base oil and a secondary oil, wherein the secondary oil is different than the base oil. The discontinuous phase may include water and a water-soluble polymer. The components of the secondary-oil-containing friction reducer are described herein. The method may further include combining the secondary-oil-containing friction reducer with at least water to form a treatment fluid. As described herein, at least a portion of the oil-external emulsion should invert releasing the water-soluble polymer into the treatment fluid.

The FIGURE shows an illustrative schematic of a system that can deliver the treatment fluids described herein to a downhole location, according to one or more examples. It should be noted that while the FIGURE generally depicts a land-based system, it is to be recognized that like systems may be operated in subsea locations as well. As depicted in the FIGURE, system 2 may include mixing tank 4, in which a treatment fluid (e.g., fracturing fluid) may be formulated. The treatment fluid be conveyed via line 6 to wellhead 8, where the treatment fluid enters wellbore 10, into subterranean formation 12. In the wellbore 10, the treatment fluid may subsequently penetrate into subterranean formation 12 at a desired location. Pump 14 may be configured to raise the pressure of the treatment fluid to a desired degree before its introduction into tubular 16. The treatment fluid may be introduced into subterranean formation 12 at any stage of a fracturing operation (or other subterranean treatment). For example, the treatment fluid may be introduced into the subterranean formation 18 after one or more factures have been induced. Fractures may be introduced for example by a pad stage. Alternatively, the treatment fluid may be introduced in the pad stage. In some embodiments, the treatment fluid may be introduced into the wellbore such that one or more fractures are induced in the subterranean formation. In some embodiments, the treatment fluid may be introduced into the wellbore such that one or more fractures are extended in the subterranean formation. It is to be recognized that system 2 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like, The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may include methods and compositions that improve friction reducer performance by addition of a secondary base oil to the original friction reducer. The methods and compositions may include any of the various features disclosed herein, including one or more of the following statements.

Statement 1. A friction reducer comprising: a continuous phase comprising a base oil and a secondary oil, wherein the secondary oil is different than the base oil; a discontinuous phase dispersed in the continuation phase, wherein the discontinuous phase comprises water and a water-soluble polymer; and an emulsifying surfactant.

Statement 2. The friction reducer of Statement 1, wherein the friction reducer comprises the secondary oil in an amount of about 5% to about 80% by weight of the friction reducer.

Statement 3. The friction reducer of Statement 1 or Statement 2, wherein the secondary oil comprises a first secondary oil and a second secondary oil.

Statement 4. A method comprising: providing a friction reducer comprising: a continuous phase comprising a base oil; a discontinuous phase dispersed in the continuous phase, wherein the discontinuous phase comprises water and a water-soluble polymer; and an emulsifying surfactant; selecting a secondary oil for the friction reducer based at least partially on one or more properties of a water sample, wherein the secondary oil is different than the base oil; and adding the secondary oil to the friction reducer to form a secondary-oil-containing friction reducer.

Statement 5. The method of Statement 4, wherein the one or more properties of the water sample comprises total dissolved solids of the water sample.

Statement 6. The method of Statement 4 or Statement 5, wherein the selecting comprises determining a total dissolved solids of the water sample.

Statement 7. The method of Statement 6, wherein the selecting comprises applying the total dissolved solids to a correlation between secondary oil Kb value and water TDS.

Statement 8. The method of any one of Statements 4 to 7, wherein the selecting comprises determining a Kb target, wherein the secondary oil is selected to have the Kb target.

Statement 9. The method of any one of Statements 4 to 8, wherein the secondary oil and/or an amount of the secondary oil is selected to provide the continuous phase of the secondary-oil-containing friction reducer with a preselected Kb target.

Statement 10. The method of any one of Statements 4 to 9, wherein the secondary-oil-containing friction reducer comprises the secondary oil in an amount of about 5% to about 80% by weight of the secondary-oil-containing friction reducer and the friction reducer in an amount of about 20% to about 95% by weight of the secondary-oil-containing friction reducer.

Statement 11. The method of any one of Statements 4 to 10, wherein the secondary oil comprises a first secondary oil and a second secondary oil.

Statement 12. The method of Statement 11, wherein the first secondary oil and the second secondary oil are selected to provide the secondary oil with a predetermined Kb target.

Statement 13. The method of any one of Statements 4 to 12, wherein the emulsifying surfactant is present in the continuous phase.

Statement 14. The method of any one of Statements 4 to 13, further comprising: combining the secondary-oil-containing friction reducer with at least water to form a treatment fluid, wherein at least a portion of the friction reducer inverts; and introducing the treatment fluid into a subterranean formation.

Statement 15. The method of any one of Statements 4 to 14, wherein the selecting comprises: adding the friction reducer to a first portion of the water sample at at least 50% of its C* concentration; performing a first friction loop test on the friction reducer in a first portion of the water sample to obtain first friction data; combining another portion of the friction reducer with a first secondary oil at a test concentration to obtain a first secondary-oil-containing friction reducer; performing a second friction loop test on the first secondary-oil-containing friction reducer in a second portion of the water sample to obtain second friction data; combining an additional portion of the friction reducer with a second secondary oil at the test concentration to obtain a second secondary-oil-containing friction reducer; performing a third friction loop test on the second secondary-oilcontaining friction reducer in a third portion of the water sample to obtain third friction data; and comparing at least the first friction data, second friction data, and third friction data.

Statement 16. A method comprising: combining at least a secondary-oil-containing-friction reducer and water to form a treatment fluid, wherein the secondary-oil-containing friction reducer comprises: a continuous phase comprising a base oil and a secondary oil, wherein the secondary oil is different than the base oil; a discontinuous phase dispersed in the continuous phase, wherein the discontinuous phase comprises water and a water-soluble polymer; and an emulsifying surfactant; and introducing the treatment fluid into a wellbore.

Statement 17. The method of Statement 16, wherein the secondary-oil-containing friction reducer comprises the secondary oil in an amount of about 5% to about 80% by weight of the secondary-oil-containing friction reducer.

Statement 18. The method of Statement 16 or Statement 17, wherein the secondary oil comprises a first secondary oil and a second secondary oil.

Statement 19. The method of any one of Statements 16 to 18, wherein the treatment fluid is introduced into a subterranean formation penetrated by the wellbore such that one or more fractures are induced in the subterranean formation.

Statement 20. The method of Statement 19, wherein the treatment fluid deposits proppant in one or more fractures in the subterranean formation penetrated by the wellbore.

To facilitate a better understanding of the present invention, the following examples of certain aspects of some embodiments are given. In no way should the following examples be read to limit, or define, the entire scope of the disclosure.

EXAMPLES

Example 1

Friction reduction performance of a friction reducer (FR-A) alone was compared to secondary base oil-containing friction reducers in which the Kb value of the secondary base oil is varied. The friction reducer used was an oil-external anionic friction reduction emulsion that was specified for application in less than 50,000 ppm TDS water with more than 5,000 ppm of multi-valent salt ion species. Two secondary oils were used, Base Oil 1 (Kb value of 23) and Base Oil 2 (Kb value of 10). Base Oil 1 is a paraffinic hydrocarbon, and Base Oil 2 is a paraffinic base stock. The secondary base oil-containing friction reducer was prepared by mixing 50 g of the friction reducer with 50 g of the secondary base oil. The % friction reduction in a water containing 100,000 ppm total dissolved solids at equal friction-reducing polymer concentrations is compared (0.25 gpt for FR-A and 0.5 gpt for FR-A plus the secondary base oil).

The friction reduction performance was determined using a Friction Flow Loop in accordance with the procedure listed below. The Friction Flow Loop was a closed loop pipeline apparatus designed to measure the pressure drop across a 2-foot section of a 12-foot stainless steel pipe. The pipe had an inner diameter of 0.57 inches with a wall roughness of 1×10$^{-6}$ inches. The Friction Flow Loop included a storage/mixing tank connected to a fixed speed progressive cavity pump which pumped the test fluid through a magnetic flow meter then through the test pipes and a return line to the storage/mixing tank.

For each test, the water containing 100,000 ppm total dissolved solids was added to the storage/mixing tank. The data acquisition system measured the flow rate, tank temperature and pressure drop across a 2-foot section of a pipe. At about 3 minutes into the test, the friction reducer (0.25 gpt for FR-A and 0.5 gpt for FR-A plus the secondary base oil) was added to the storage/mixing tank. Flow rate, tank temperature, and pressure drop across the 2-foot section of pipe recorded at one-second intervals. The Friction Flow Loop flows 10 L of the tested samples at 10 gallon per minute (gpm) for 10 minutes.

Approximately three minutes of data that was collected prior to the addition of the friction reducer was used to verify instrument readings and provide a baseline of data with a known fluid. The pressure drop across the 2-foot section of pipe for the water prior to the addition of the friction reducer was measured and denoted as $\phi P_{water}$ Following the addition of the friction reducer to the tank, the measured pressure drop ($\Delta P_{measured}$), was compared to pressure drop for the water ($\Delta P_{water}$) to determine the % Friction Reduction ("% FR") using the following equation:

$$\%FR = 1 - \frac{\Delta P_{measured}}{\Delta P_{water}}$$

The results of the friction reduction tests are shown in Table 1 below.

TABLE 1

| Friction Reducer | Secondary Base oil | Secondary Base oil Kb | % Friction Reduction |
|---|---|---|---|
| FR-A | none | — | 50 |
| FR-A | Base Oil 1 | 23 | 57 |
| FR-A | Base Oil 2 | 10 | 63 |

Accordingly, Table 1 illustrates that improved friction reduction was obtained by inclusion of the secondary base oil for equivalent amounts of the polymer.

Example 2

Additional tests were performed to further evaluate addition of secondary base oils to friction reducers. Secondary-oil-containing friction reducers are prepared by mixing 66 g of a friction reducer (FR-A) with 33 g of secondary base oil compositions containing varying ratios of two secondary base oils, Base Oil 3 (Kb value of 8) and Base Oil 4 (Kb value of 30). Base Oil 3 is a mineral oil, and Base Oil 4 is an isoparaffinic hydrocarbon. Friction reduction performance of 0.5 gpt in water containing 100,000 ppm TDS was evaluated for each secondary base oil-containing friction reducers, as described above in Example 1. Further blends contain 66 g of FR-B and 33 g of secondary base oil composition or 82 g of FR-C and 18 g of secondary base oil composition were prepared and tested for % friction reduction. FR-B was an oil-external anionic friction reduction emulsion specified for application up to 50,000 ppm TDS water. FR-C was an oil-external anionic friction reduction emulsion specified for application of up to 200,000 ppm TDS water with less than 6% composition of multivalent salt ion in the dissolved solid. The results of the friction reduction tests are shown in Table 2 below.

TABLE 2

| Friction Reducer | % of Secondary Base Oil Phase | | Kb of Secondary Oil Phase | % Friction Reduction |
|---|---|---|---|---|
| | Base Oil 3 | Base Oil 4 | | |
| FR-A | 100 | 0 | 8 | 62 |
| FR-A | 50 | 50 | 19 | 62 |
| FR-A | 25 | 75 | 24 | 62 |
| FR-A | 12.5 | 87.5 | 27 | 58 |
| FR-A | 6.2 | 93.8 | 28 | 51 |
| FR-A | 0 | 100 | 30 | 39 |
| FR-B | 100 | 0 | 8 | 52 |
| FR-B | 87 | 13 | 10 | 39 |
| FR-B | 50 | 50 | 19 | 23 |
| FR-B | 0 | 100 | 30 | 15 |
| FR-C | 100 | 0 | 8 | 63 |
| FR-C | 75 | 25 | 13 | 53 |
| FR-C | 50 | 50 | 19 | 36 |
| FR-C | 25 | 75 | 24 | 32 |
| FR-C | 0 | 100 | 30 | 32 |

Accordingly, Table 2 illustrates the use of two different secondary oils to obtain an optimum final secondary oil formulation as shown by the friction reduction value. Table 2 also illustrates the synergistic effect between the base oil of the FR to the secondary oil. All three FR, FR-A, FR-B, and FR-C have different base oil properties. Different Kb value on the secondary oil is required for each FR to achieve the optimum friction reduction performance.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   providing a friction reducer comprising:
      a continuous phase comprising a base oil;
      a discontinuous phase dispersed in the continuous phase, wherein the discontinuous phase comprises water and a water-soluble polymer; and
      an emulsifying surfactant;
   selecting a secondary oil for the friction reducer based at least partially on one or more properties of a water sample, wherein the secondary oil is different than the base oil,
      wherein selecting the secondary oil for the friction reducer comprises developing a correlation between the secondary oil and the one or more properties of the water sample, wherein the one or more properties are selected from the group consisting of: TDS; pH; temperature; ionic composition; and any combination thereof; and
   adding the secondary oil to the friction reducer to form a secondary-oil-containing friction reducer.

2. The method of claim 1, wherein the one or more properties of the water sample comprises total dissolved solids of the water sample.

3. The method of claim 1, wherein the selecting comprises determining a total dissolved solids of the water sample.

4. The method of claim 1, wherein the selecting comprises determining a Kb target, wherein the secondary oil is selected to have the Kb target.

5. The method of claim 1, wherein the secondary oil and/or an amount of the secondary oil is selected to provide the continuous phase of the secondary-oil-containing friction reducer with a preselected Kb target.

6. The method of claim 1, wherein the secondary-oil-containing friction reducer comprises the secondary oil in an amount of about 5% to about 80% by weight of the secondary-oil-containing friction reducer and the friction reducer in an amount of about 20% to about 95% by weight of the secondary-oil-containing friction reducer.

7. The method of claim 1, wherein the secondary oil comprises a first secondary oil and a second secondary oil.

8. The method of claim 7, wherein the first secondary oil and the second secondary oil are selected to provide the secondary oil with a predetermined Kb target.

9. The method of claim 1, wherein the emulsifying surfactant is present in the continuous phase.

10. The method of claim 1, further comprising: combining the secondary-oil-containing friction reducer with at least water to form a treatment fluid, wherein at least a portion of the friction reducer inverts; and introducing the treatment fluid into a subterranean formation.

11. The method of claim 1, wherein the selecting comprises:
   adding the friction reducer to a first portion of the water sample at at least 50% of its C* concentration;
   performing a first friction loop test on the friction reducer in a first portion of the water sample to obtain first friction data;
   combining another portion of the friction reducer with a first secondary oil at a test concentration to obtain a first secondary-oil-containing friction reducer;
   performing a second friction loop test on the first secondary-oil-containing friction reducer in a second portion of the water sample to obtain second friction data;

combining an additional portion of the friction reducer with a second secondary oil at the test concentration to obtain a second secondary-oil-containing friction reducer;

performing a third friction loop test on the second secondary-oil-containing friction reducer in a third portion of the water sample to obtain third friction data; and comparing at least the first friction data, second friction data, and third friction data.

12. The method of claim 1, wherein the water comprises one or more salts.

13. The method of claim 1, wherein the water is present in an amount from about 4% to about 50% by weight of the secondary-oil containing friction reducer.

14. The method of claim 1, wherein the water-soluble polymer is anionic, cationic, non-ionic or zwitterionic.

15. The method of claim 1, further comprising selecting the water-soluble polymer, wherein selecting the water-soluble polymer comprises determining one or more molecular weights of the water-soluble polymer.

16. The method of claim 15, wherein selecting the water-soluble polymer comprises correlating the one or more molecular weights to friction reduction.

17. The method of claim 1, wherein the secondary-oil added to the friction reducer comprises an additional emulsifying surfactant.

18. The method of claim 1, wherein the base oil is a natural oil, a modified oil, or a synthetic oil.

19. A method comprising:
providing a friction reducer comprising:
a continuous phase comprising a base oil;
a discontinuous phase dispersed in the continuous phase, wherein the discontinuous phase comprises water and a water-soluble polymer;
an emulsifying surfactant;
selecting a secondary oil for the friction reducer based at least partially on one or more properties of a water sample, wherein the secondary oil is different than the base oil, wherein the selecting comprises determining a total dissolved solids of the water sample, wherein the selecting comprises applying the total dissolved solids to a correlation between secondary oil Kb value and water TDS; and
adding the secondary oil to the friction reducer to form a secondary-oil-containing friction reducer.

\* \* \* \* \*